United States Patent [19]
Odar

[11] 4,303,769
[45] Dec. 1, 1981

[54] PROCESS FOR PREPARING SUBSTANTIALLY GEL-FREE CIS-1,4-POLYBUTADIENE

[75] Inventor: Joseph Odar, South Euclid, Ohio

[73] Assignee: The B. F. Goodrich Company, Akron, Ohio

[21] Appl. No.: 176,423

[22] Filed: Aug. 8, 1980

Related U.S. Application Data

[63] Continuation-in-part of Ser. No. 936,265, Aug. 22, 1978, abandoned.

[51] Int. Cl.³ ............................................. C08F 4/70
[52] U.S. Cl. ..................................... 526/93; 526/92; 526/340.4
[58] Field of Search ................................. 526/93, 92

[56] References Cited

U.S. PATENT DOCUMENTS

| | | | |
|---|---|---|---|
| 2,977,349 | 3/1961 | Brookway et al. | 526/169.1 |
| 3,066,127 | 11/1962 | Carlson et al. | 526/93 |
| 3,573,249 | 3/1971 | Henderson et al. | 526/138 |
| 3,843,618 | 10/1974 | Yagi et al. | 526/93 |
| 3,966,697 | 6/1976 | Kampf | 526/93 |
| 3,983,183 | 9/1976 | Kampf et al. | 526/138 |
| 4,224,426 | 9/1980 | Odar | 526/92 |

OTHER PUBLICATIONS

Gippin, I. & E. C., Product Research and Development, No. 1, (Mar. 1962), pp. 32–39.

Primary Examiner—Stanford M. Levin
Attorney, Agent, or Firm—Nestor W. Shust

[57] ABSTRACT

Substantially gel-free cis-1,4-polybutadiene is prepared by an improved process comprising adding in any order to the polymerization vessel butadiene, a cobalt catalyst, water and a solvent, provided that if the solvent is an aromatic or a chlorinated solvent at most 15 percent by weight based on the weight of butadiene is added at that stage. Thereafter is added either the entire amount of an aromatic or a chlorinated solvent, or the remainder of such a solvent if part of it was added earlier. Then an aluminum catalyst, comprised of one or more organoaluminum compounds, is added and the polymerization is carried out.

13 Claims, No Drawings

PROCESS FOR PREPARING SUBSTANTIALLY GEL-FREE CIS-1,4-POLYBUTADIENE

This application is a continuation-in-part of application Ser. No. 936,265, filed Aug. 22, 1978, now abandoned.

BACKGROUND OF THE INVENTION

Polymerization of conjugated dienes, especially butadiene-1,3, is well known in the art using a variety of catalysts, including a mixture of a cobalt and an aluminum compound. Thus U.S. Pat. No. 3,135,725 discloses cobalt salt-hydrocarbyl aluminum compound catalysts and U.S. Pat. No. 3,046,265 discloses alkyl aluminum, cobalt halide and acetyl halide catalyst, both catalyst systems being useful in polymerizing conjugated diolefins. The following additional cobalt-aluminum compound catalyst systems are disclosed in the indicated patents for polymerization of conjugated diolefins: cobalt chloride-methylaluminum chloride in U.S. Pat. No. 3,094,514, cobalt octoate-ethylaluminum chloride in Br. Pat. No. 916,383, cobalt ethyl hexoate-ethylaluminum chloride in Br. Pat. No. 916,384, cobalt octoate-diethylaluminum chloride and water in German Pat. No. 1,495,935 and cobalt stearate-diethylaluminum chloride in Br. Pat. No. 941,739.

Although generally the order of addition of the reactants and the catalysts apparently was not considered to be of critical importance, various patents disclose different orders of addition. Thus in British Pat. No. 926,036 the reactants and catalysts were added in the order of solvent, aluminum compound, cobalt chloride in pyridine and finally butadiene while in British Pat. No. 924,427 the order was: aromatic solvent, cobalt and then aluminum compounds as catalysts, additional aromatic solvent, aliphatic solvent and finally butadiene. U.S. Pat. No. 3,284,431 discloses adding to the reaction vessel an aromatic solvent, butadiene, an aluminum compound catalyst an activator and finally a cobalt compound catalyst. Another order of addition is disclosed in U.S. Pat. No. 3,646,001 where cobalt and aluminum catalysts, such as cobalt octoate and diethyl aluminum chloride, are prereacted in wet benzene at a temperature below 20° C. and then are added butadiene and additional solvents such as benzene and butene-1. Published Japanese patent application SHO-44-10276 discloses dissolving a cobalt catalyst in dry toluene, feeding butadiene-1,3 to the reaction vessel and then adding an aluminum catalyst to begin polymerization. This method, however, yields cis-1,4-polybutadiene having a relatively high gel content.

SUMMARY OF THE INVENTION

The polymerization of butadiene-1,3 is carried out in the presence of a catalyst containing a cobalt compound and one or more aluminum compounds. The improvement of this invention comprises adding first to the reaction vessel: butadiene, a cobalt compound, water and a solvent, provided that if the solvent is an aromatic or a chlorinated solvent at most 15 percent, based on the weight of butadiene, is added at this first stage. If the solvent is a paraffinic and/or an olefinic solvent, there is no limit as to the amount that may be added at this stage. If an aromatic or a chlorinated solvent is employed, the remaining portion is added in the second stage or all of the aromatic or chlorinated solvent may be added in the second stage. Aluminum catalyst is the last component to be added. This immediately initiates polymerization yielding substantially linear and gel-free cis-1,4-polybutadiene.

DETAILED DISCLOSURE

This invention is directed to an improved process for polymerizing butadiene-1,3 to produce primarily linear, gel-free cis-1,4-polybutadiene. More specifically, the improved process is carried out in the presence of a catalyst containing a cobalt compound and at least one organoaluminum compound, the improvement which comprises (a) adding to the polymerization vessel butadiene, water, a cobalt catalyst and a solvent in which butadiene monomer and polymer are substantially soluble, in the order specified, provided that if the solvent is an aromatic or a chlorinated solvent at most 15 percent by weight based on the weight of total charge is added at this stage;

(b) thereafter adding the entire amount of an aromatic or a chlorinated solvent, or the remainder of such a solvent if part of it was added earlier;

(c) thereafter adding an aluminum catalyst comprised of one or more aluminum compounds, said catalyst having a chlorine to aluminum ratio of between 0.7:1 and 1.6:1;

said polymerization system containing an aluminum to cobalt ratio between 40:1 and 300:1 and a water to aluminum ratio between 0.1:1 and 0.6:1; and finally (d) polymerizing said butadiene-1,3 to a conversion of 30 to 90 percent producing gel-free cis-polybutadiene.

The present invention combines a number of interrelated process parameters which result in an unexpected improvement in the production of substantially linear, gel-free cis-1,4-polybutadiene. The critical features are the order of addition of the monomer, the catalysts and the solvents as well as the ratios of aluminum to cobalt, chlorine to aluminum and water to aluminum. To obtain full advantage of the present improved process all of the specified parameters and ratios must be observed.

The catalysts that are employed in butadiene polymerization are well known in the art. Various cobalt and aluminum compounds which are useful as catalysts are disclosed in the patents and published patent applications mentioned above as well as U.S. Pat. Nos. 3,094,595 and 3,222,348, British Pat. Nos. 849,589; 995,957 and 1,042,172 and German Pat. Nos. 1,144,922; 1,199,992 and 1,495,935.

The cobalt catalyst can be any organic cobalt compound such as a cobalt salt of an organic acid, a cobalt complex and the like, since the catalyst is preferably soluble in a solvent or the monomer. Typical of such solvent or monomer soluble cobalt compounds are cobalt octoate, cobalt sorbate, cobalt adipate, cobalt 2-ethylhexoate, cobalt stearate, cobalt acetylacetonate and the like compounds wherein the organic portion of the molecule contains about 5 to 20, preferably 8 to 18, carbon atoms and one or two carboxylic functions, as well as acetylacetonate. Such compounds are well known to those skilled in the art.

The other essential catalyst component is an alkyl aluminum halide which can be used as a mono- or dialkyl aluminum halide, a mixture thereof, or a mixture of any combination of $R_3Al$, $R_2AlX$, $RAlX_2$ or $AlX_3$ type compounds wherein R is an alkyl and X is halogen, more preferably, the chloride. The alkyl groups normally contain 1 to 12 carbon atoms, more preferably, about 2 to 8 carbon atoms. Particularly useful are dialkyl aluminum chlorides wherein the alkyl contains 2 to 6 carbon atoms, especially diethyl aluminum chloride (DEAC), and the so-called sesquichloride which is a mixture of aluminum trichloride and trialkyl aluminum, normally having a composition of about $R_{1.5-1.9}AlX_{1.6-1.1}$, or a mixture of $R_3Al$, $R_2AlCl$ and $RAlCl_2$ to give the desired Al:Cl ratio.

Typical catalyst combinations are cobalt II octoate and $Et_{1.66}AlCl_{1.33}$; cobalt II ethylhexoate and $Et_{1.33}AlCl_{1.67}$; cobalt octoate and $Et_2AlCl+H_2O$; cobalt-acetylacetonate and $AlHCl_2$-ether; cobalt-3-acetylacetonate and $Et_3Al_2Cl_3$ and ethyl acetate; cobalt diacetylacetonate and $Et_2AlCl$; cobalt stearate and $Et_2AlCl$; cobalt acetylacetonate and $Et_2AlCl$, and the like. These catalyst components are well known and clearly defined in the patent literature.

The preferred cobalt catalysts are cobalt alkanoates where the alkanoate moiety is derived from long chain saturated acids having 6 to 20 carbon atoms, most preferably cobalt octoate. The preferred aluminum catalyst is a dialkyl aluminum chloride where the alkyl group has 1 to 4 carbon atoms, most preferably diethyl aluminum chloride. Often a mixture of trialkyl aluminum and dialkyl aluminum chloride or of trialkyl aluminum, dialkyl aluminum chloride, alkyl aluminum dichloride and aluminum trichloride may be used.

The ratio of aluminum to cobalt should be in the range of 40:1 to 300:1 and preferably 50:1 to 120:1. The ratio of chlorine to aluminum should be from 0.7:1 to 1.6:1 and preferably from 0.8:1 to 1.2:1. The ratio of water to aluminum should be from 0.10:1 to 0.60:1 and preferably from 0.35:1 to 0.45:1.

As noted above, the order of addition of the various materials to the reaction vessel is most critical. At first butadiene and water are added in any order or simultaneously. Usually butadiene is added first followed by the desired amount of water. If the solvent is paraffinic or monoolefinic, it is added next in full amount. If an aromatic or a chlorinated solvent is employed, only up to 15 percent of such a solvent, based on the weight of butadiene, can be added in the first stage. Once the above listed components have been charged, and only after the mixture has become substantially homogeneous, the remaining portion, or the entire amount, of the aromatic or chlorinated solvent is added. It is most critical that the aluminum catalyst, which may be an alkyl aluminum chloride compound or a mixture of aluminum compounds, some of which must contain chlorine, be added to the polymerization vessel as the very last component. Upon addition of the aluminum catalyst polymerization immediately starts.

A preferred order of addition of the various components comprises:

(a) dissolving a cobalt compound in butadiene-1,3 to which is then added the desired amount of water or water may be first added to butadiene-1,3 followed by the addition of the solution of a cobalt compound;

(b) adding in any order a solvent in which butadiene monomer and polymer are substantially soluble, (c) adding to the above reaction mixture an organoaluminum catalyst, and (d) polymerizing said butadiene-1,3.

A practical method of preparing the cobalt catalyst is to pre-dissolve the cobalt compound in an appropriate hydrocarbon or chlorinated hydrocarbon solvent. Saturated aliphatic or cycloaliphatic hydrocarbons such as hexane, heptane, octane, cyclopentane, methylcyclopentane, cyclohexane; olefins such as butene-1, pentene-1, hexene-1, and the like; hydrocarbons, such as benzene, toluene and chlorinated hydrocarbons such as methylenechloride, chlorobenzene and the like are suitable, cyclohexane being preferred. Various ISOPAR solvents (sold by EXXON) are found to be very useful. They are a mixture of isoparaffinic hydrocarbon fractions boiling at certain temperature ranges. For example ISOPAR C is primarily 2,2,4-trimethylpentane and other trimethyl pentane isomers. This mixture boils at a range of approximately 206°–220° F. (96.7°–104° C.).

A convenient procedure is to first prepare (or purchase) a solution of a cobalt compound having e.g. 12 percent cobalt concentration (or any desired concentration) which is then diluted to 0.0063 millimole/cc. (or any other concentration). Butadiene-1,3 solution of a cobalt compound and water can be added to the reaction vessel in any order. Usually the reactor is first charged with butadiene followed by the addition of the solution of a cobalt compound and then the desired amount of water. Another possible order of addition is butadiene, water and the cobalt compound solution or wet butadiene, that is, butadiene containing the desired amount of water, cobalt compound solution and dry butadiene. Although it is less preferable to do so, it is possible to introduce water into the reaction vessel by employing wet solvent. Next is added a diluent which is a solvent for both the monomer and the polymer. By "solvent" is meant a specific solvent or a mixture of two or more solvents, a mixture being preferred. Usually aliphatic, cycloaliphatic and aromatic hydrocarbon solvents are preferred, but chlorinated solvents may also be employed. Useful solvents are those listed above. One purpose of the "solvent" is to control the polymerization temperature which is accomplished by refluxing the solvent. Therefore the selection of a solvent or the solvent mixture will depend on its boiling point and the temperature that is to be maintained during polymerization. Finally, when an aluminum catalyst is added polymerization is immediately initiated.

Conversion of butadiene-1,3 to cis-1,4-polybutadiene is in the range of from 30 to 90 percent, but the degree of conversion is to a large extent dependent on the concentration of butadiene. When the butadiene concentration is low the conversion should be relatively high e.g. from 60 to 90%, but if the concentration of butadiene is high, the conversion should be relatively low, e.g. from 30 to 60%.

The following Examples are presented to further illustrate the improved process of this invention, without introducing any limitations thereto.

EXAMPLE I 13.7 g. of butadiene-1,3 containing 0.305 m moles of water were charged to a polymerization vessel followed by 1.28 ml. of cobalt octoate in cyclohexane having the concentration of 0.0063 m mole/cc (giving the effective amount of 0.0081 m mole of cobalt octoate). Thereafter were added 54.3 g. of dry butadiene-1,3, followed by 154 g. of butene-1, followed by 221 g. of cyclohexane. Finally 1.70 ml. of diethyl aluminum chloride in cyclohexane having the concentration of 0.717 m mole/cc (giving the effective amount of 1.219 m mole of $Et_2AlCl$). Polymerization was carried out at 20° C. Polymerization was continued for 30 min. to a 52.94 percent conversion. Then 5 ml. of ethanol was added while mixing to destroy the catalyst, followed by the addition of an antioxidant (2,6-di-t-butyl-p-cresol).

The cis-1,4-polybutadiene was isolated by coagulating in ethanol.

The product had a very low gel content; % gel (millipore) was only 0.019 (description of the procedure for this determination is provided below).

Following generally the procedure described above additional polymerizations were carried out employing the ingredients and the amounts as indicated in Table I below. The ingredients are listed in the Table in the order of addition to the polymerization vessel.

TABLE I

| | Example No. | | | | |
|---|---|---|---|---|---|
| | 2 | 3 | 4 | 5 | 6 |
| Wet benzene | 22.9 g | — | 25.0 g | 25.0 g | 25.0 g |
| (M mole $H_2O$) | (0.567) | | (0.161) | (0.161) | (0.161) |
| Wet butadiene | — | 29.0 ml. | — | — | — |
| (M mole $H_2O$) | — | (0.646) | — | — | — |
| Co octoate | 1.88 ml[1] | 2.06 ml[3] | 1.88 ml | 1.88 ml | 1.88 ml |
| (M mole) | (0.0118) | (0.0130) | (0.0118)[4] | (0.0118)[4] | (0.0118)[4] |
| Butadiene | 68.0 g | 39.0 g | 73.3 g | 73.3 g | 73.3 g |
| Butene-1 | 153.0 g | 153.0 g | 153.0 g | 153.0 g | 153.0 g |
| Benzene | 202.0 g | — | 202.0 g | 202.0 g | 202.0 g |
| Cyclohexane | — | 215.0 g | — | — | — |
| Toluene | — | 17.2 g | — | — | — |
| DEAC | 1.93 ml[2] | 2.21 ml[2] | 1.93 ml[2] | 1.93 ml[2] | 1.93 ml[2] |
| (M moles of Al) | (1.4183) | (1.625) | (1.4186) | (1.4186) | (1.4186) |
| Cl/Al ratio | 1.00 | 1.00 | 1.00 | 1.00 | 1.00 |
| $H_2O$/Al ratio | 0.40 | 0.40 | 0.40 | 0.40 | 0.40 |
| Al/Co ratio | 120 | 125 | 120 | 120 | 120 |
| Polymeriz. time | 75 min. | 90 min. | 25 min. | 50 min. | 75 min. |
| % Conversion | 60.29% | 54.41% | 32.35% | 54.51% | 66.17% |
| % Gel (millipore) | 0.009 | 0.019 | 0.000 | 0.069 | 0.100 |

| | Example No. | | | | |
|---|---|---|---|---|---|
| | 7 | 8 | 9 | 10 | 11 |
| Wet benzene | 26.0 g | 26.0 g | 26.0 g | 21.10g | 21.10g |
| (M mole $H_2O$) | (0.567) | (0.567) | (0.567) | (0.469) | (0.469) |
| Wet butadiene | — | — | — | — | — |
| (M mole $H_2O$) | — | — | — | — | — |
| Co octoate | 1.88 ml | 1.88 ml | 1.88 ml | 1.49 ml[3] | 1.49 ml[3] |
| (M mole) | (0.0118)[4] | (0.0118)[4] | (0.0118)[4] | (0.0094) | (0.0094) |
| Butadiene | 68.0 g | 68.0 g | 68.0 g | 68.0 g | 68.0 g |
| Butene-1 | 153.0 g | 153.0 g | 153.0 g | 153.0 g | 153.0 g |
| Benzene | 202.0 g | 202.0 g | 202.0 g | 208.0 g | 208.0 g |
| Cyclohexne | — | — | — | — | — |
| Toluene | — | — | — | — | — |
| DEAC | 1.93 ml | 1.93 ml | 1.93 ml | 2.55 ml | 2.55 ml |
| (M mole of Al) | (1.4183) | (1.4183) | (1.4183) | (1.875) | (1.875) |
| Cl/Al ratio | 1.00 | 1.00 | 1.00 | 1.00 | 1.00 |
| $H_2O$/Al ratio | 0.40 | 0.40 | 0.40 | 0.25 | 0.25 |
| Al/Co ratio | 120 | 120 | 120 | 200 | 200 |
| Polymeriz. time | 25 min. | 50 min. | 75 min. | 30 min. | 60 min. |
| % Conversion | 22.05% | 38.23% | 48.52% | 35.29% | 52.94% |
| % Gel (millipore) | 0.039 | 0.059 | 0.089 | 0.039 | 0.040 |

| | Example No. | | | |
|---|---|---|---|---|
| | 12 | 13 | 14 | 15 |
| Wet benzene | 21.10 g | — | — | — |
| (M mole $H_2O$) | (0.469) | — | — | — |
| Wet butadiene | — | 23.5 g | 23.5 g | 23.5 g |
| (M mole $H_2O$) | — | (0.520) | (0.520) | (0.520) |
| Co octoate | 1.49 ml[3] | 1.67 ml[3] | 1.67 ml[3] | 1.67 ml[3] |
| (M mole) | (0.0094) | (0.0105) | (0.0105) | (0.0105) |
| Butadiene | 68.0 g | 44.5 g | 44.5 g | 44.5 g |
| Butene-1 | 153.0 g | 153.0 g | 153.0 g | 153.0 g |
| Benzene | 208.0 g | — | — | — |
| Cyclohexane | — | 224.0 g | 224.0 g | 224.0 g |
| Toluene | — | 9.0 g | 9.0 g | 9.0 g |
| DEAC | 2.55 | 1.78 | 1.78 | 1.78 |
| (M mole of Al) | (1.875) | (1.308) | (1.308) | (1.308) |
| Cl/Al ratio | 1.00 | 1.00 | 1.00 | 1.00 |
| $H_2O$/Al ratio | 0.25 | 0.40 | 0.40 | 0.40 |
| Al/Co ratio | 200 | 125 | 125 | 125 |
| Polymeriz. Time | 90 min. | 30 min. | 60 min. | 90 min. |
| % Conversion | 61.76% | 40.44% | 60.29% | 70.58% |
| % Gel (millipore) | 0.039 | 0.029 | 0.020 | 0.029 |

[1] Solution of cobalt octoate in pentene-1 having a concentration of 0.0063 M mole/cc.
[2] Solution of $Et_2AlCl$ in benzene having a concentration of .735 M mole/cc.
[3] Solution of cobalt octoate in cyclohexane having a concentration of 0.0063 M mole/cc.
[4] Cobalt octoate in cyclohexane having a concentration of 0.0063 M mole/cc. was added to butadiene and permitted to stand at room temperature for 24 hrs. before polymerization took place.

The percent (%) gel content (millipore) that is reported in the above examples is determined according to the following procedure:

Millipore Gel Content Determination

A 2 g. sample of cis-1,4-polybutadiene is weighed to the nearest tenth of a milligram, cut up into small pieces and placed in a 4 oz. (113.66 cc) bottle. 100 ml of a filtered toluene is added to the bottle which is then placed in a shaker for 2 to 4 hours until all the rubber is dissolved. The solution is then filtered under vacuum through a preweighed 47 mm, 8 micron, MF Millipore filter disc. The bottle is flushed several times with toluene which is also filtered. Then the filter is placed in a small aluminum pan and dried in a vacuum oven at 150° C. for 30 minutes. The dried filter is weighed and percent gel is calculated according to the following formula:

$$\% \text{ gel} = \frac{\text{Final wt. of filter} - \text{Initial wt. of filter}}{\text{Wt. of sample}}$$

Examples 4 to 9 were repeated varying only the order of addition of the various reactants and catalysts to the polymerization vessel. One order of addition was as follows: Wet benzene, the rest of benzene required, butene-1, butadiene, diethylaluminum chloride and finally cobalt octoate. A second order of addition differed from the above by adding first cobalt octoate and then diethylaluminum chloride. The percent gel by the millipore method in the polybutadiene obtained by these two methods could not be measured because it was too high. The millipore method is very sensitive and if the polymer contains more than 0.7% gel then the filter becomes plugged and the desired determination cannot be made. Thus, though a true gel content comparison could not be made, it was clear that when the polymerization was carried out outside the process parameters of this invention, the resulting cis-polybutadiene contained a substantially higher gel content than when the polymerization was carried out according to this invention.

EXAMPLES 16–22

Following the procedure of Example I, butadiene is polymerized employing catalysts and solvents as indicated in Table II below.

TABLE II

| | Example No. | | | |
|---|---|---|---|---|
| | 16 | 17 | 18 | 19 |
| Wet benzene | 19.9 g. | 19.9 g. | 19.9 g. | 19.9 g |
| (M mole $H_2O$) | (0.546) | (0.546) | (0.546) | (0.546) |
| Butadiene | 67.5 g. | 67.5 g. | 67.5 g. | 67.5 g. |
| Co octoate | 1.95 ml[3] | 1.00 ml[3] | 1.00 ml[3] | — |
| (M mole) | (0.0138) | (0.0071) | (0.0071) | — |
| Co (acetyl acetate)$_2$ | — | 1.00 ml. | — | — |
| (M mole) | — | (0.0071) | — | — |
| Co (acetyl acetate)$_3$ | — | — | 1.00 ml | 2.00 ml |
| (M mole) | — | — | (0.0071) | (0.0142) |
| Butene-1 | 153 g. | 153 | 153 | 153 |
| Benzene | 210 g. | 210 g. | 210 g. | 210 g. |
| DEAC | 3 ml[2] | 3 ml. | 3 ml. | 3 ml. |
| (M moles of Al) | (2.185) | (2.185) | (2.185) | (2.185) |
| $H_2O$/Al ratio | 0.25 | 0.25 | 0.25 | 0.25 |
| Al/Co ratio | 158 | 153 | 153 | 153 |

| | Example No. | | |
|---|---|---|---|
| | 20 | 21 | 22 |
| Wet benzene | 11.2 g. | 12.6 g. | 15.0 g. |
| (M mole $H_2O$) | (0.124) | (0.278) | (0.333) |
| Butadiene | 68.0 g. | 68.0 g. | 68.0 g. |
| Co octoate | 1.63 ml[3] | 2.77 ml[3] | 2.45 ml[3] |
| (M mole) | (0.0103) | (0.0174) | (0.0154) |
| Butene-1 | 151.0 g. | 153.0 g. | 154.0 g. |
| Benzene | 212.0 g | 216.0 g. | 224.0 g. |
| DEAC | 1.12 ml. | 1.70 ml. | 0.79 ml. |
| (M moles of Al) | (0.825) | (1.250) | (0.578) |
| i-Bu AlCl$_2$ | — | 0.25 ml | — |
| (M mole) | — | (0.145) | — |
| TEAl | — | — | 0.16 ml. |
| (M mole) | — | — | (0.192) |
| Cl/Al ratio | 1.0 | 1.10 | 0.75 |
| $H_2O$/Al ratio | 0.15 | 0.20 | 0.432 |
| Al/Co ratio | 80 | 80 | 50 |

DEAC is diethyl aluminum chloride
i-Bu AlCl is isobutyl aluminum dichloride
TEAl is triethyl aluminum
[2,3]For explanation of these, see Table I.

I claim:

1. An improved process for the production of substantially gel-free cis-1,4-polybutadiene in the presence of a catalyst comprising a mixture of cobalt octoate or cobalt stearate and at least one aluminum compound selected from the group consisting of trialkyl aluminum, dialkyl aluminum chloride, alkyl aluminum dichloride and aluminum chloride or a mixture thereof, wherein said alkyls having 1 to 4 carbon atoms, the improvement comprising
    (a) adding to the polymerization vessel butadiene, water, and a solution of the cobalt catalyst and then adding a solvent in which butadiene monomer and polymer are substantially soluble, provided that if the solvent is an aromatic or a chlorinated solvent at most 15 percent by weight based on the weight of total charge is added at this stage;
    (b) after the mixture has become substantially homogeneous, adding the entire amount of an aromatic or a chlorinated solvent, or the balance of such a solvent if part thereof was added earlier;
    (c) thereafter adding at least one aluminum compound, said compound having a chlorine to aluminum ratio of between 0.7:1 and 1.6:1;
    said polymerization system containing an aluminum to cobalt ratio between 40:1 and 300:1 and a water to aluminum ratio between 0.1:1 and 0.6:1; and finally
    (d) polymerizing said butadiene-1,3 to a conversion of 30 to 90 percent producing gel-free cis-polybutadiene.
2. A process of claim 1 wherein the ratio of aluminum to cobalt is between 50:1 and 120:1 and the ratio of water to aluminum is between 0.35:1 and 0.45:1.
3. A process of claim 2 wherein the solvent is a mixture of benzene and a monoolefin.
4. A process of claim 3 wherein the monoolefin is butene-1.
5. A process of claim 2 wherein the solvent is a mixture of a saturated cycloaliphatic and a monoolefin.
6. A process of claim 2 wherein the solvent is a mixture of a saturated cycloaliphatic, a monoolefin and toluene.
7. A process of claim 6 wherein the monoolefin is butene-1.
8. A process of claims 5 or 6 wherein the catalyst is comprised of cobalt octoate and a dialkyl aluminum chloride.
9. A process of claim 8 wherein the dialkyl aluminum chloride is diethyl aluminum chloride.
10. A process of claims 5 or 6 wherein the catalyst is comprised of cobalt octoate and a mixture of organoaluminum compounds selected from the group consisting of trialkyl aluminum, dialkyl aluminum chloride and alkyl aluminum dichloride.

11. A process of claim 1 comprising
(a) dissolving cobalt octoate in wet butadiene-1,3;
(b) adding dry butadiene-1,3 to the wet butadiene which contains the predissolved cobalt compound;
(c) adding a solvent selected from a mixture of (1) benzene and butene-1 and (2) cyclohexene, butene-1 and toluene;
(d) adding to the above reaction mixture an aluminum compound; and
(e) polymerizing said butadiene.

12. A process of claim 1 comprising
(a) dissolving cobalt octoate in butadiene;
(b) adding water to the butadiene-cobalt octoate mixture;
(c) adding a solvent selected from a mixture of (1) benzene and butene-1 and (2) cyclohexene, butene-1 and toluene;
(d) adding to the above reaction mixture an aluminum compound; and
(e) polymerizing said butadiene.

13. A process of claims 11 or 12 wherein the ratio of aluminum to cobalt is between 50:1 and 120:1 and the ratio of water to aluminum is between 0.35:1 and 0.45:1.

* * * * *